Jan. 18, 1927.

L. M. MANLEY 1,614,799

PISTON

Filed April 2, 1926

Inventor
L. M. Manley

By Jack Ashley

Attorney

Patented Jan. 18, 1927.

1,614,799

UNITED STATES PATENT OFFICE.

LEWIS M. MANLEY, OF DALLAS, TEXAS.

PISTON.

Application filed April 2, 1926. Serial No. 99,212.

This invention relates to new and useful improvements in pistons.

A particular object of the invention is to simplify the structure by forming the sleeve of steel or other suitable metal from which lugs may be upset for securing the sleeve to the piston body.

A construction designed to carry out the invention will be hereinafter described together with other features of the invention.

The invention will be more readily understood from a reading of the following specification and by reference to the accompanying drawings, in which an example of the invention is shown and wherein.

Figure 1:
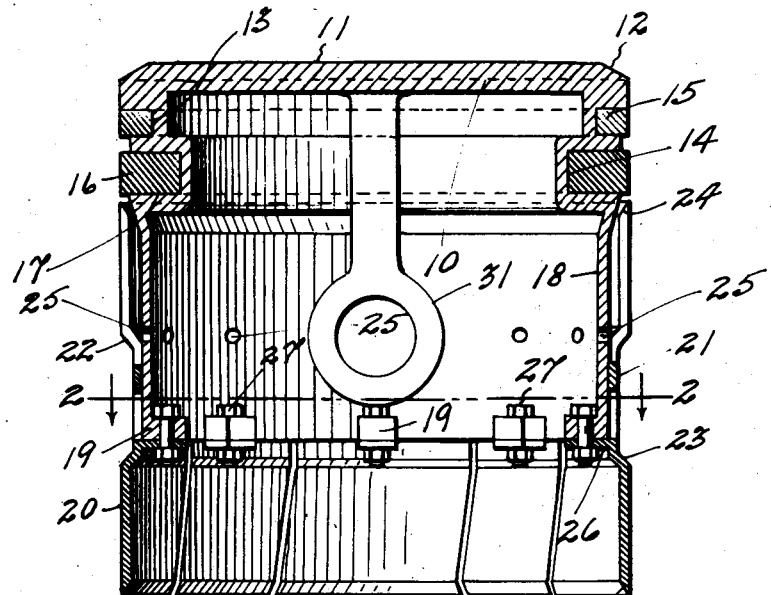
Fig. 1 is a vertical sectional view of piston constructed in accordance with my invention.
Figure 2:
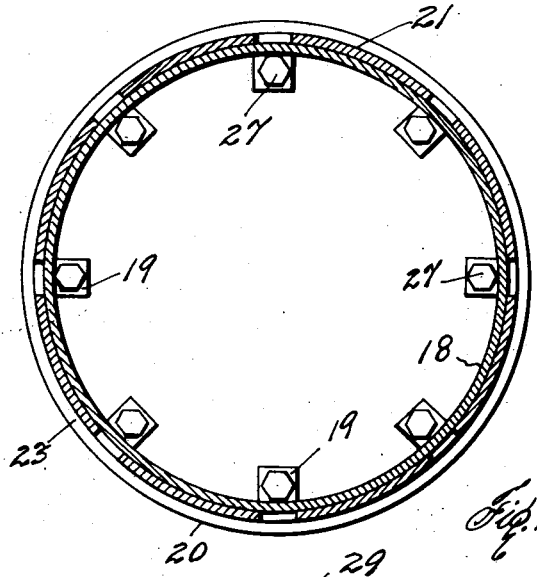
Fig. 2 is a horizontal sectional view taken on the line 2—2 of Fig. 1.
Figure 3:
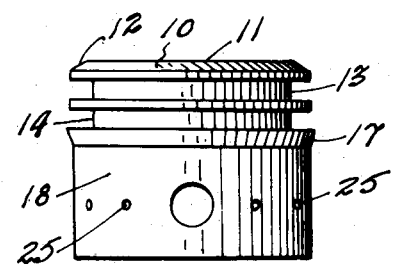
Fig. 3 is an elevation of the body.
Figure 4:
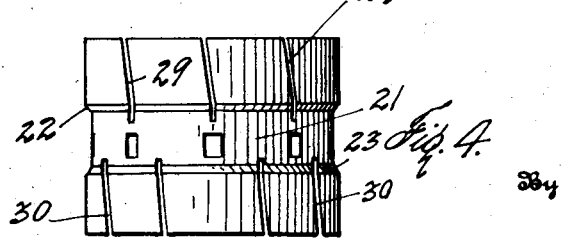
Fig. 4 is an elevation of the sleeve.

In the drawings the numeral 10 designates a piston body having a top 11 provided with the usual beveled edge 12. In the upper portion of the side of the piston body I provide superposed ring grooves 13 and 14 receiving respectively rings 15 and 16. The side wall of the body is cut back at 17 immediately from the bottom of the groove 14, to a reduced shank 18. Interned spaced ears 19 are provided at the lower end of the shank.

A comparatively thin sleeve 20 of steel or other metal suitable for the purpose is formed with a central annular depression or internal offset 21, having a shoulder 22 at its upper end and a shoulder 23 at its lower end. The offset has an internal diameter such as to snugly receive the lower end of the shank 18. The offset causes the upper surrounding portion of the sleeve to be spaced from body 18 and the portion 17. The upper end of the sleeve has an inward bevel 24 co-acting with the portion 17 to form an oil entrance. The shank 18 has drain ports 25.

The offset 21 has a plurality of lugs 26 upset therefrom and bent inwardly to underlie the ears 19 to which they are fastened by bolts 27. The upper edge of the sleeve is provided with inwardly directed kerfs 29, extending down from its edge 24 and also the lower edge is formed with kerfs 30 extending up from the edge 28. These kerfs terminate at the offset 21, so that all of the portions of the sleeve which contacts with the cylinder walls are formed into flexible fingers having their outer ends free. Such a sleeve will readily conform to an out-of-round cylinder. Pin bearing members 31 are formed at each side of the shank and open through the sides thereof, thus receiving oil from the sleeve.

One of the advantages gained by this structural arrangement is the reduction in weight as well as economy in the cost of production.

Various changes in the size and shape of the different parts, as well as modifications and alterations may be made within the scope of the appended claims.

What I claim is:

1. In a piston, a body having a reduced shank, a sleeve having an inwardly directed annular offset, lugs upset from the offset, and means upon the shank to which the lugs are fastened.

2. In a piston, a body having a reduced shank, a sleeve having a centrally disposed annular offset embracing said shank, inwardly bent ears formed from said offset portion, and a series of inwardly projecting lugs within the shank to which said ears are secured.

3. In a piston, a body having a reduced shank, a sleeve having an inwardly directed annular offset, lugs upset from the offset and ears on the shank to which the lugs are fastened, the sleeve having flexible fingers.

4. In a piston, a body having a reduced shank, a sleeve having an inwardly directed annular offset, lugs upset from the offset and ears on the shank to which the lugs are fastened, the sleeve having its upper and lower edges beveled and having inwardly extending kerfs.

In testimony whereof I affix my signature.

LEWIS M. MANLEY.